(12) United States Patent
Furusawa et al.

(10) Patent No.: US 6,636,342 B2
(45) Date of Patent: Oct. 21, 2003

(54) LIGHT SOURCE USED IN WAVELENGTH MULTIPLEXING

(75) Inventors: Satoshi Furusawa, Osaka (JP); Susumu Morikura, Yawata (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 153 days.

(21) Appl. No.: 09/764,380

(22) Filed: Jan. 19, 2001

(65) Prior Publication Data
US 2001/0010586 A1 Aug. 2, 2001

(30) Foreign Application Priority Data
Jan. 21, 2000 (JP) .......................... 2000-012543

(51) Int. Cl.$^7$ .................. G02F 2/02; G02B 6/293; H04J 14/02
(52) U.S. Cl. ................. 359/326; 385/24; 398/82
(58) Field of Search ................... 359/326–332, 359/124, 127; 385/15, 24; 398/79, 82

(56) References Cited

U.S. PATENT DOCUMENTS 5,436,757 A * 7/1995 Okazaki et al. ............. 359/332
5,838,709 A * 11/1998 Owa .......................... 372/68
5,923,683 A * 7/1999 Morioka et al. ............. 359/330
6,097,540 A * 8/2000 Neuberger et al. ........... 359/618

FOREIGN PATENT DOCUMENTS

JP 2-23732 1/1990

* cited by examiner

Primary Examiner—John D. Lee
(74) Attorney, Agent, or Firm—Wenderoth, Lind & Ponack, L.L.P.

(57) ABSTRACT

A group of semiconductor laser diodes outputs fundamental-wave lights controlled so that each wavelength thereof is double the wavelength of a light for wavelength multiplexing transmission. The fundamental-wave lights are provided to a light receiver, and then to a group of wavelength conversion elements, wherein the fundamental-wave lights are converted into lights each having half the wavelength of each fundamental-wave light. The group of wavelength conversion elements outputs lights including the converted lights each having half the wavelength of each fundamental-wave light and the fundamental-wave lights. The outputted lights are passed through a group of fundamental-wave optical eliminators typified by an optical filter for passing the converted lights and eliminating the fundamental-wave lights, a guiding part, and then an optical multiplexer, and then guided to a transmission medium. Thus, the light controlled in wavelength with high accuracy can be outputted without controlling the semiconductor laser diodes in oscillation wavelength with high accuracy.

12 Claims, 6 Drawing Sheets

LIGHT SOURCE USED IN WAVELENGTH MULTIPLEXING

BACKGROUND OF THE INVENTION

1. Field of the Invention

The present invention relates to light sources used in wavelength multiplexing and, more specifically, to a light source for outputting a light for wavelength division multiplexing transmission where a plurality of lights varied in wavelength are multiplexed.

2. Description of the Background Art

In optical fiber communications, a wavelength division multiplexing (WDM) technique by using a broad band characteristic of an optical fiber is utilized. With the WDM technique, a plurality of optical signals varied in wavelength from one another can be transmitted at one time through a single optical fiber. Therefore, the WDM technique is quite useful in terms of effective use of optical wavelengths. In this WDM technique, however, each of a plurality of laser light sources has to be controlled in oscillation wavelength in order to prevent crosstalk between optical signals varied in wavelength from each other.

One example of conventional light sources used in the WDM technique is shown in FIG. 4. One example of how to control each semiconductor laser diode in oscillation wavelength is shown in FIG. 5.

As shown in FIG. 4, in the conventional light source used in wavelength multiplexing, a plurality of lights varied in wavelength ($\lambda 1, \lambda 2, \lambda 3, \ldots, \lambda n-1, \lambda n$) are outputted from a group of semiconductor laser diodes 100, and then provided through a guiding part 5, which is a waveguide or fiber, to an optical multiplexer 6 for multiplexing. A light outputted from the optical multiplexer 6 is transmitted through a transmission medium 7. The oscillation wavelength of each diode in the group of semiconductor laser diodes 100 is controlled based on temperature dependence thereof.

With reference to FIG. 5, how to control the oscillation wavelength of each semiconductor diode 101 included in the group of semiconductor laser diodes 100 is now described. First, a light outputted from the semiconductor diode 101 that oscillates in the vicinity of a wavelength $\lambda k$ is branched by an optical branched 110. One branched light is provided to an optical band-pass filter 111 that passes a light of the wavelength $\lambda k$. A light intensity detector 112 detects the intensity of the light after being passed through the optical band-pass filter 111. In this case, the intensity detected by the light intensity detector 112 varies according to the difference between the oscillation wavelength of the semiconductor laser diode 101 and the wavelength that can be passed through the optical band-pass filter 111. For example, the light intensity detected by the light intensity detector 112 becomes maximum when the wavelength of the light outputted from the semiconductor laser diode 101 is equal to the wavelength that can be passed through the optical band-pass filter 111.

According to the detection result, a control signal generator 113 outputs a control signal to a temperature changer 114 implemented by, for example, a Peatier element. The temperature at the temperature changer 114 is changed based on the control signal. With this change, the temperature at the semiconductor laser diode 101 is controlled so that the intensity of the light detected by the light intensity detector 112 becomes maximum. In general, as the temperature becomes higher, the oscillation wavelength of the semiconductor laser diode is uniquely shifted to a longer side. Therefore, with temperature control at the semiconductor laser diode 101, the oscillation wavelength thereof is changed. As such, feed-back control is carried out so that the semiconductor laser diode 101 is always equal in wavelength to the optical band-pass filter 111. Thus, the semiconductor laser diode 101 can be controlled in oscillation wavelength.

For local networks, such as optical subscriber networks, optical LANs, and optical CATV, a wavelength band of 1.3 $\mu m$ or 1.55 $\mu m$ is typically used. In such wavelength band, a low-loss characteristic can be observed in a silica optical single-mode fiber. For private networks in which transmission is carried out within several tens of meters at most, a polymethyl methacrylate (PMMA) plastic optical fiber is useful because it is easy to handle and more economical. In the PMMA plastic optical fiber, 0.65 $\mu m$ is used as the wavelength band, where the low-loss characteristic can be observed.

FIG. 6a shows a relation between a loss characteristic of the silica optical single-mode fiber and an optical spectrum of the conventional light source used in wavelength multiplexing. FIG. 6b shows a relation between a loss characteristic of the PMMA plastic optical fiber and the optical spectrum of the conventional light source used in wavelength multiplexing.

In FIG. 6a, assume that a silica single-mode optical fiber whose low-loss window in a long wavelength band is several hundreds nm or longer is used. If ten optical signals are multiplexed within a wavelength band of 100 nm, for example, each wavelength interval $\Delta$ becomes 10 nm, if constant. Also, each semiconductor laser diode is controlled in wavelength with such accuracy as that the oscillation wavelength thereof is on the order of 1 nm, that is, at least 10% of the wavelength interval $\Delta$.

As shown in FIG. 6b, on the other hand, as for the PMMA plastic optical fiber, its low-loss window in a wavelength band of 0.65 $\mu m$ is about 20 nm, which is extremely narrower compared with that of the silica optical fiber. If, for example, ten optical signals are multiplexed within the wavelength band of 0.65 $\mu m$, the wavelength interval $\Delta$ becomes 2 nm. Therefore, high accuracy, on the order of 0.2 nm or shorter, is required for controlling each semiconductor laser diode. Thus, to carry out a large amount of wavelength multiplexing transmission in such wavelength band, higher accuracy is required for controlling each semiconductor laser diode in oscillation wavelength, thereby causing complication in structure and increase in cost.

SUMMARY OF THE INVENTION

Therefore, an object of the present invention is to provide a light source used in wavelength multiplexing capable of outputting a light controlled in wavelength with higher accuracy without controlling a semiconductor laser diode in oscillation wavelength with higher accuracy even when a large amount of wavelength multiplexing transmission is carried out over a transmission medium with a limited low-loss window, such as a PMMA plastic optical fiber.

One aspect of the present invention is directed to a light source for outputting a light for wavelength division multiplexing transmission where a plurality of lights varied in wavelength are multiplexed, the light source comprising:

a light emitter for emitting fundamental-wave lights each controlled to be k (k>1) times longer in wavelength than lights to be multiplexed; and a wavelength converter for receiving the fundamental-wave lights and outputting lights including lights of one-kth a wavelength of each of the fundamental-wave lights.

As described above, according to the above-stated aspect, wavelength control can be carried out with higher accuracy without controlling the light emitter in oscillation wavelength with higher accuracy. Therefore, the light source can output a light suitable for high-density wavelength multiplexing transmission.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
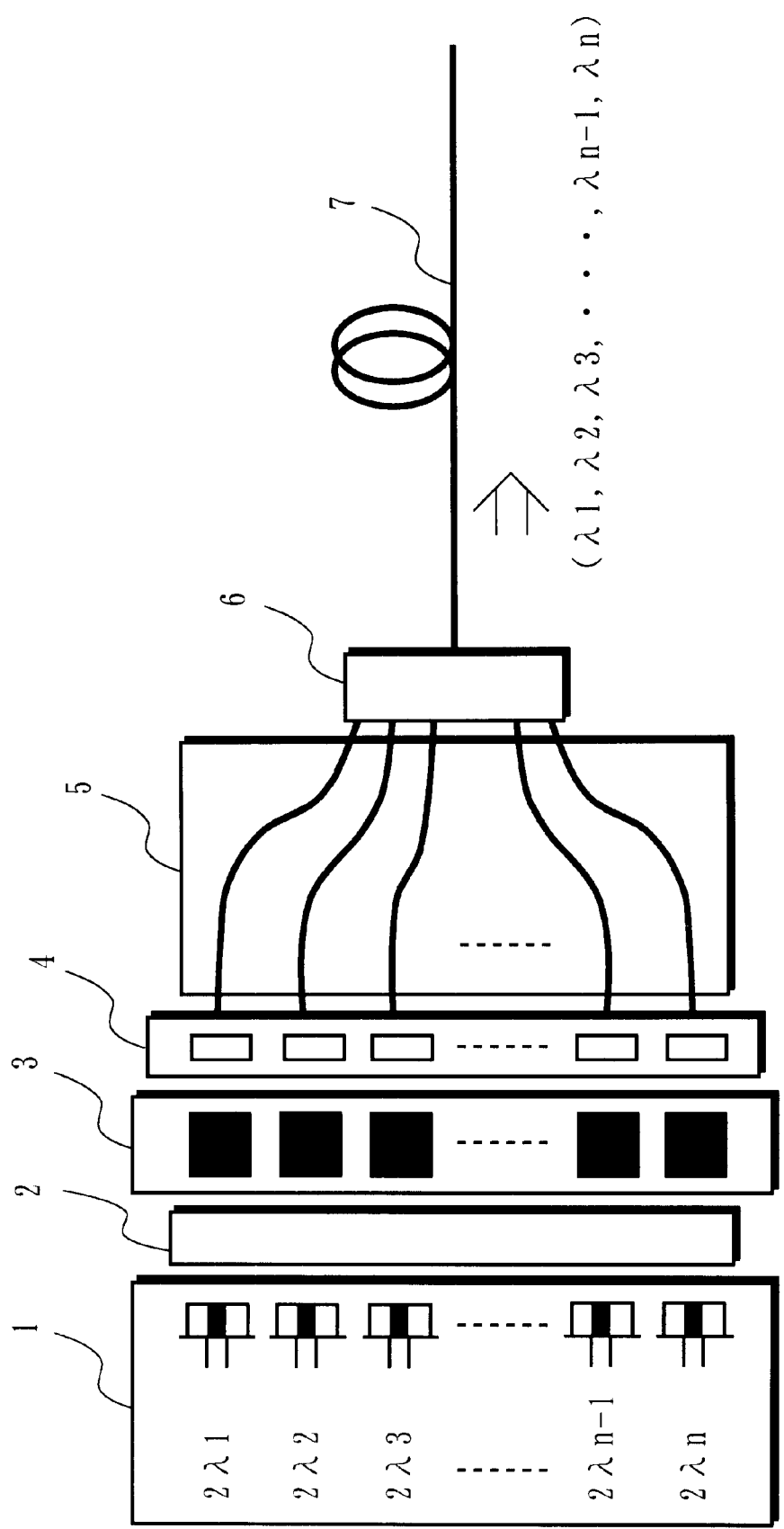
FIG. 1 is a diagram showing the structure of a light source used in wavelength multiplexing according to a first embodiment of the present invention.
Figure 2:
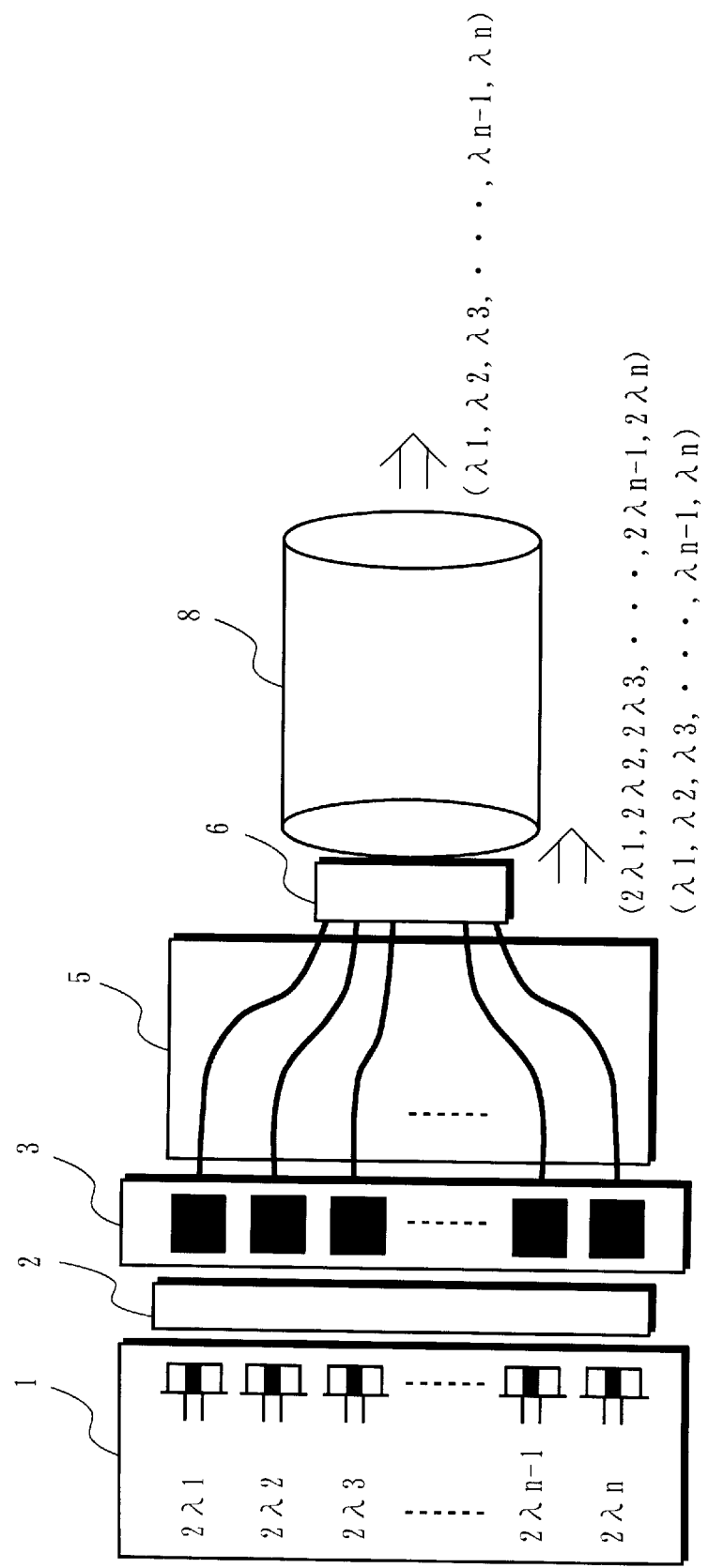
FIG. 2 is a diagram showing the structure of a light source used in wavelength multiplexing according to a second embodiment of the present invention.
Figure 3:
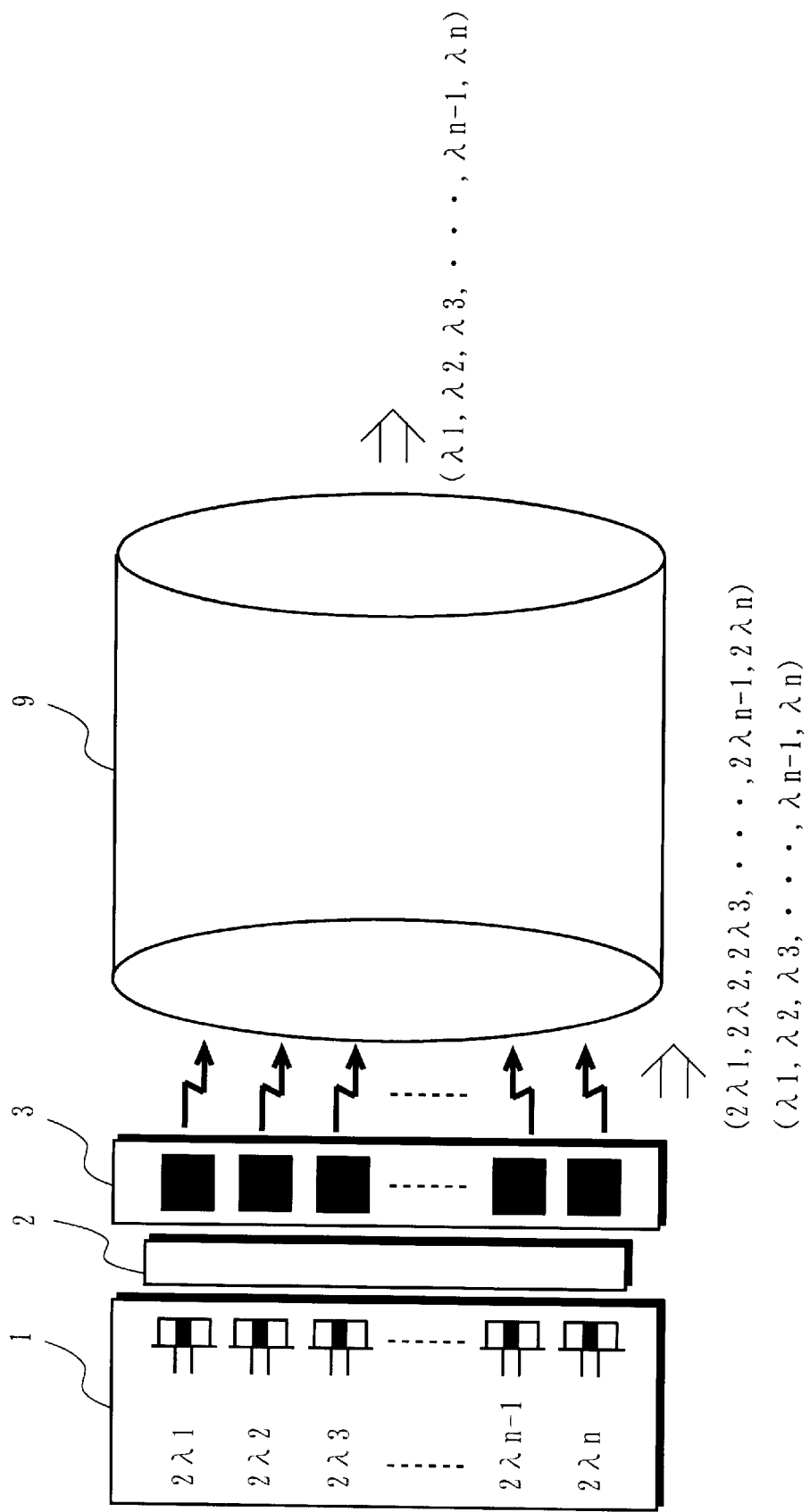
FIG. 3 is a diagram showing the structure of a light source used in wavelength multiplexing according to a third embodiment of the present invention.
Figure 4:
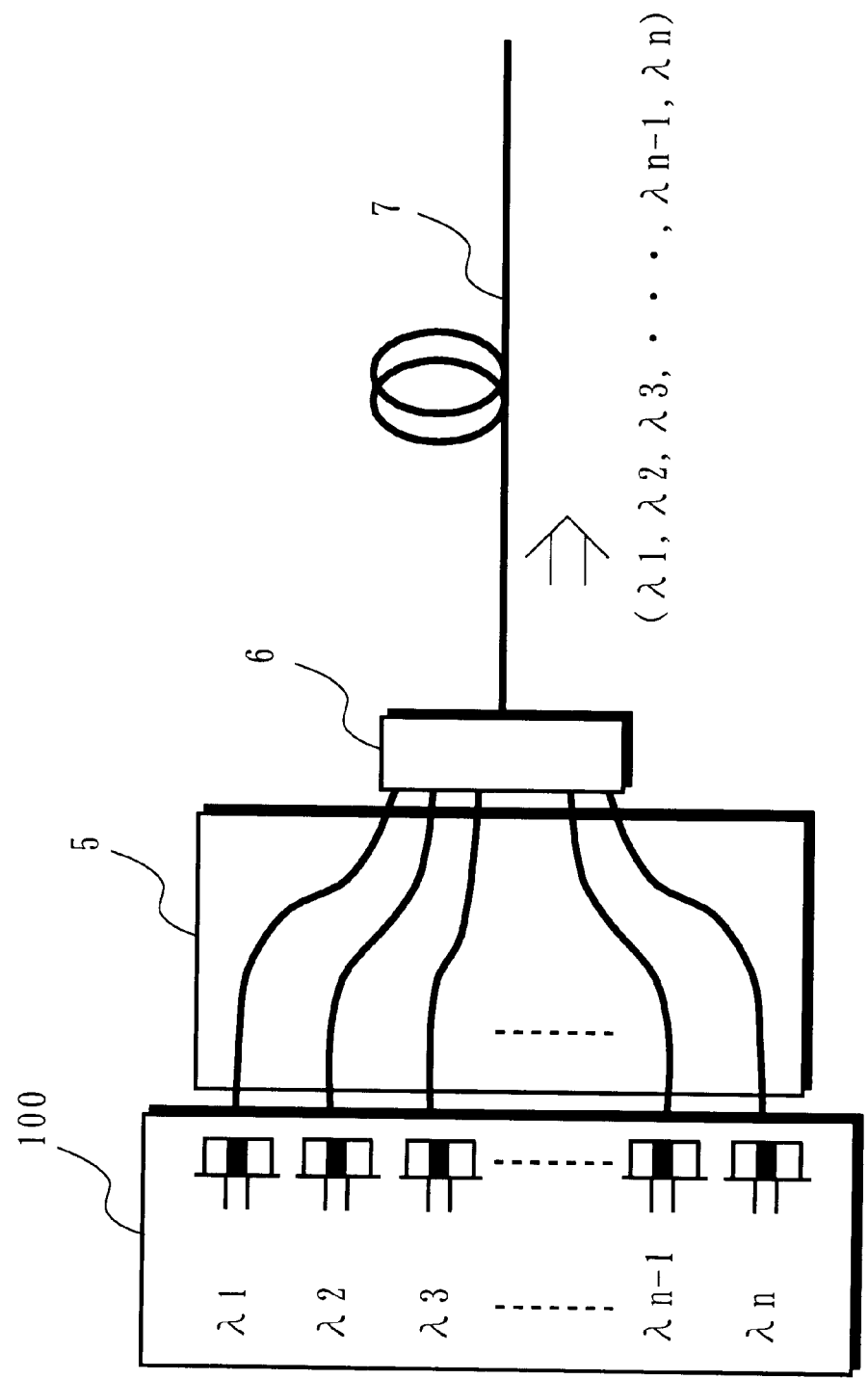
FIG. 4 is a diagram showing the structure of a conventional light source used in wavelength multiplexing.
Figure 5:
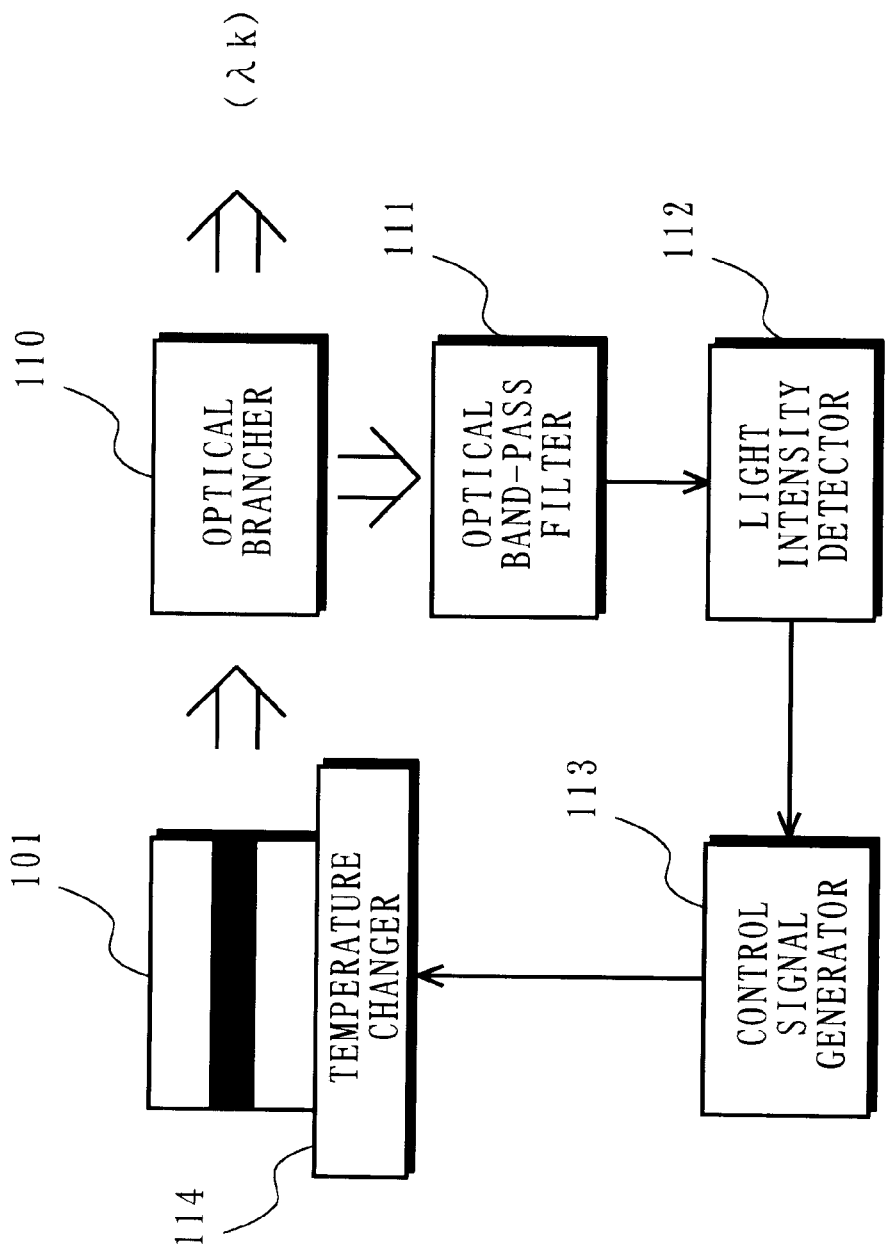
FIG. 5 is a diagram in assistance of explaining how to control an oscillation wavelength of each semiconductor laser diode.
Figure 6A:
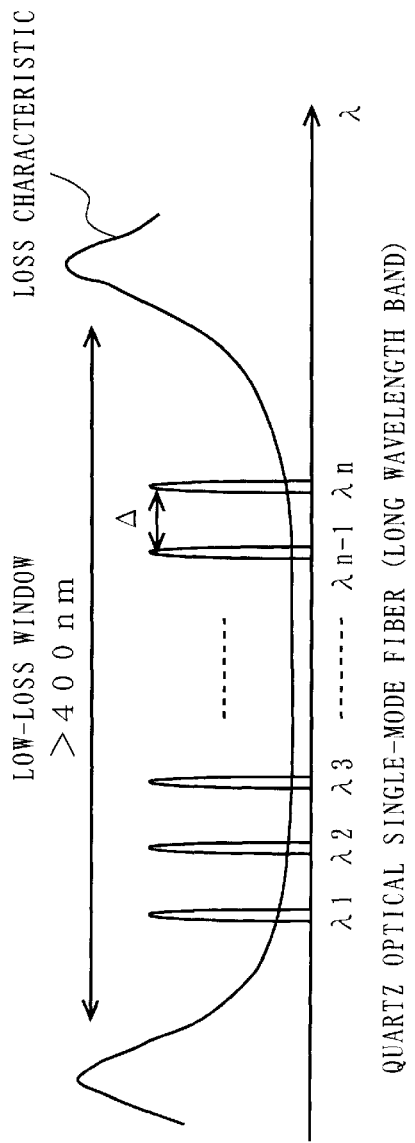
FIGS. 6a and 6b are diagrams each showing a relation between a loss characteristic of a fiber and an optical spectrum of the conventional light source used in wavelength multiplexing.
Figure 6B:
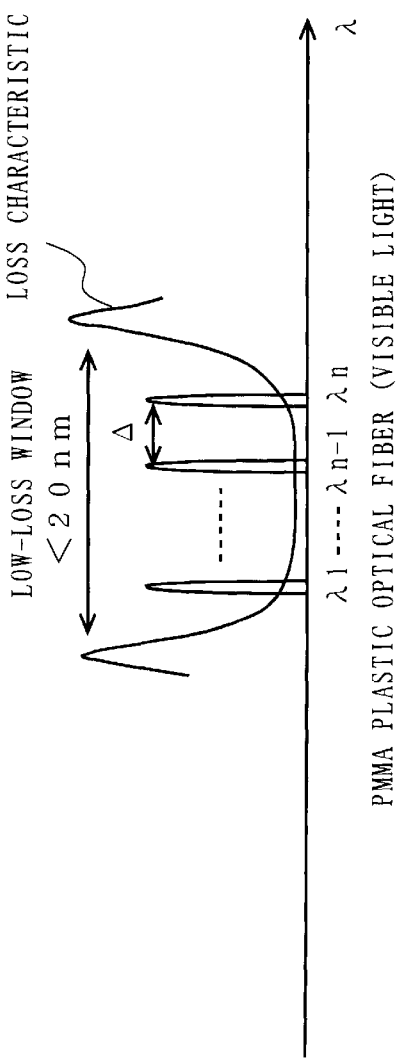

Embodiments of the present invention are described below. FIGS. 1, 2, 3 are diagrams showing the structures of light sources used in wavelength multiplexing according to first, second, and third embodiments, respectively. Components identical in structure to those in the conventional light source used in wavelength multiplexing shown in FIG. 4 are provided with the same reference numerals. Also, components identical in structure to those among these three embodiments are provided with the same reference numerals.

(First Embodiment)

In FIG. 1, the light source used in wavelength multiplexing according to the first embodiment includes a group of semiconductor laser diodes 1, a light receiver 2, a group of wavelength conversion elements 3, a group of fundamental-wave light eliminators 4, the guiding part 5, the optical multiplexer 6, and the transmission medium 7.

The group of semiconductor laser diodes 1 emits fundamental-wave lights having wavelengths of $2\lambda 1$, $2\lambda 2$, $2\lambda 3$, ..., $2 \lambda n-1$, $2\lambda n$, which are double the wavelength of each light for wavelength multiplexing transmission. These fundamental-wave lights are controlled in wavelength so that wavelength interval therebetween becomes $\Delta$. The fundamental-wave lights are received by the light receiver 2 and then the group of wavelength conversion elements 3, wherein each fundamental-wave light is converted into a light of one-half wavelength. The group of wavelength conversion elements 3 produces lights including the converted lights of half the wavelengths of the fundamental-wave lights and the fundamental-wave lights, which are additional. These produced lights are provided to the group of fundamental-wave light eliminators 4. The group of fundamental-wave light eliminators 4 passes only the converted lights and eliminates the additional fundamental-wave lights. Then, the converted lights that have been passed are guided to the guiding part 5, the optical multiplexer 6, and then the transmission medium 7.

Note that the light receiver 2 and the guiding part 5 may be implemented by either waveguides or fibers.

Further, as the wavelength conversion element, various optical crystal material capable of generating second-harmonics in combination with a laser light source can be used.

Still further, in the present embodiment, even though not necessarily indispensable, the group of fundamental-wave eliminators 4 is provided for eliminating the additional fundamental-wave lights included in the lights outputted from the group of wavelength conversion elements 3. Such elimination prevents in advance unexpected trouble caused by transmission of the additional lights in the optical transmission system.

Next, the principle and effect of the light source used in wavelength multiplexing according to the first embodiment shown in FIG. 1 is described below. Now, the fundamental-wave lights of the wavelengths $$(2\lambda 1, 2\lambda 2, \ldots, 2\lambda n)$$

arranged at the wavelength intervals $\Delta$ ($2\lambda 1-2\lambda 2=\Delta$, for example) are converted by the group of wavelength conversion elements 3 into lights of a combination of one-half wavelength lights and the fundamental-wave lights $$((\lambda 1, 2\lambda 1), (\lambda 2, 2\lambda 2), \ldots, (\lambda n, 2\lambda n)).$$

Among the converted lights, the fundamental-wave lights are additional, and therefore eliminated by the group of fundamental-wave light eliminators 4. Thus, only the one-half wavelength lights, that is, $$(\lambda 1, \lambda 2, \ldots, \lambda n)$$

can be passed through the group of fundamental-wave light eliminators 4. At this time, a wavelength interval between the passed lights is, for example, $$(\lambda 1)-(\lambda 2)=\Delta/2,$$

which is just a half of the wavelength interval $\Delta$ between the fundamental-wave lights. Therefore, with the above-stated operation, wavelength density and wavelength control accuracy can be doubled in the light source, with respect to those of the fundamental-wave lights. More specifically, if the wavelength interval between the converted lights of 5 nm and the wavelength control accuracy of 0.5 nm are required in the light source, 1 nm is enough for the oscillation wavelength control accuracy of the laser diodes. In other words, only half a target value for wavelength control accuracy is enough for controlling the group of semiconductor laser diodes in wavelength.

Note that, in the present embodiment, the wavelength interval $\Delta$ between adjacent fundamental-wave lights is constant for the purpose of simplification. Needless to say, however, the same effect can be achieved if the wavelength interval $\Delta$ is variable.

As described above, according to the present embodiment, each of the fundamental-wave lights is controlled so that its wavelength becomes double the wavelength of the light for wavelength multiplexing transmission, and then is converted by the wavelength conversion element into a light of one-half wavelength. Therefore, it is possible to construct a light source used in wavelength multiplexing capable of outputting a light controlled in wavelength with double accuracy without controlling the semiconductor laser diodes in oscillation wavelength with higher accuracy. Moreover, transmission capacity can be easily increased with a less complicated system structure.

(Second Embodiment)

FIG. 2 is a diagram showing the structure of the light source used in wavelength multiplexing according to the second embodiment of the present invention. As shown in FIG. 2, the light source according to the second embodiment is structured such as that the transmission medium 7 of the light source according to the first embodiment is a PMMA plastic optical fiber. In the second embodiment, the low-loss window of the PMMA plastic optical fiber 8 is within the wavelength band of 650 nm. Therefore, 1300 nm is used as the wavelength band for the fundamental-wave lights emitted from the group of semiconductor laser diodes 1.

The group of wavelength conversion elements 3 outputs converted lights having $\lambda 1, \lambda 2, \lambda 3, \ldots, \lambda n-1, \lambda n$ within the wavelength band of 650 nm and fundamental-wave lights having $2\lambda 1, 2\lambda 2, 2\lambda 3, \ldots, 2\lambda n-1, 2\lambda n$ within the wavelength band of 1300 nm. These lights outputted from the group of wavelength conversion elements 3 are provided through the guiding part 5 and then optical multiplexer 6 to the PMMA plastic optical fiber 8 as the transmission medium. The loss within the wavelength band of 1300 nm in the PMMA plastic optical fiber 8 is 10,000 db/km or more. Therefore, the fundamental-wave lights, which are additional, are propagated over a very short distance in the PMMA plastic optical fiber 8, and then eliminated therein.

As described above, according to the second embodiment, in addition to the effects according to the first embodiment, the loss characteristic of the PMMA plastic optical fiber 8 can eliminate the fundamental-wave lights passed through the group of wavelength conversion elements 3. Therefore, the light source used in wavelength multiplexing can be more simplified in structure.

(Third Embodiment)

FIG. 3 is a diagram showing the structure of the light source used in wavelength multiplexing according to the third embodiment of the present invention. As shown in FIG. 3, the light source according to the third embodiment is structured such that the lights outputted from the group of wavelength conversion elements 3 of the light source according to the second embodiment are directly and collectively provided to a PMMA plastic optical fiber 9 of large diameter, and then multiplexed therein.

Compared with the size of the group of wavelength conversion elements 3, the PMMA plastic optical fiber 9 is sufficiently large in core diameter, such as 1 mm. Therefore, by connecting the group of wavelength conversion elements 3 and the PMMA plastic optical fiber 9 together, the guiding part 5 typified by a waveguide for guiding light outputs and the optical multiplexer 6 become unnecessary.

As described above, according to the third embodiment, in addition to the effects according to the second embodiment, the guiding part 5 and the optical multiplexer 6 are not required, and therefore the light source used in wavelength multiplexing can be much more simplified in structure.

In the description of the above first to third embodiments, the fundamental-wave lights having double the wavelength of the light for wavelength multiplexing transmission are outputted, and then converted by the group of wavelength conversion elements into the lights of one-half wavelength. Alternatively, for example, fundamental-wave lights having three times the wavelength of the light for wavelength multiplexing transmission may be outputted, and then converted into lights of one-third wavelength.

While the invention has been described in detail, the foregoing description is in all aspects illustrative and not restrictive. It is understood that numerous other modifications and variations can be devised without departing from the scope of the invention.

What is claimed is:

1. A light source for outputting a light for wavelength division multiplexing transmission wherein a plurality of lights varied in wavelength are multiplexed, said light source comprising:

emitter means for emitting a plurality of fundamental-wave lights controlled to be k times longer in wavelength than lights to be multiplexed and to have a wavelength interval between each adjacent fundamental-wave light, wherein k is greater than 1;

wavelength converter means for receiving said fundamental-wave lights and outputting lights including lights of one-kth a wavelength of each of said fundamental-wave lights; and multiplexing means for multiplexing the lights outputted from said wavelength converter means.

2. The light source for wavelength multiplexing according to claim 1, further comprising a transmission medium for transmitting a light from said multiplex means.

3. The light source for wavelength multiplexing according to claim 2, wherein k is 2, said wavelength converter means is an optical material crystal having a second-order non-linear optical effect, a wavelength band of said fundamental-wave light is 1.3 $\mu$m, and said transmission medium is a polymethyl methacrylate plastic optical fiber.

4. A light source for outputting a light for wavelength division multiplexing transmission wherein a plurality of lights varied in wavelength are multiplexed, said light source comprising:

emitter means for emitting a plurality of fundamental-wave lights controlled to be k times longer in wavelength than lights to be multiplexed and to have a wavelength interval between each adjacent fundamental-wave light, wherein k is greater than 1; and wavelength converter means for receiving said fundamental-wave lights and outputting lights including lights of one-kth a wavelength of each of said fundamental-wave lights;

wherein the lights outputted from the wavelength converter means further include fundamental-wave lights, and a wavelength band of each of said fundamental-wave lights is eliminated through a loss at transmission.

5. A light source for outputting a light for wavelength division multiplexing transmission wherein a plurality of lights varied in wavelength are multiplexed, said light source comprising:

emitter means for emitting a plurality of fundamental-wave lights controlled to be k times longer in wavelength than lights to be multiplexed and to have a wavelength interval between each adjacent fundamental-wave light, wherein k is greater than 1; and wavelength converter means for receiving said fundamental-wave lights and outputting lights including lights of one-kth a wavelength of each of said fundamental-wave lights, wherein
said k is 2,
said wavelength converter means is an optical material crystal having a second-order non-linear optical effect,
the lights outputted from the wavelength converter means further include fundamental-wave lights, and
a wavelength band of each of said fundamental-wave lights is eliminated through a loss at transmission.

6. A light source for outputting a light for wavelength division multiplexing transmission wherein a plurality of lights varied in wavelength are multiplexed, said light source comprising:

emitter means for emitting a plurality of fundamental-wave lights controlled to be k times longer in wavelength than lights to be multiplexed and to have a wavelength interval between each adjacent fundamental-wave light, wherein k is greater than 1;

wavelength converter means for receiving said fundamental-wave lights and outputting lights including lights of one-kth a wavelength of each of said fundamental-wave lights; and a transmission medium for directly receiving the lights outputted from said wavelength converter means and transmitting the lights, wherein said transmission medium is a polymethyl methacrylate plastic optical fiber;

wherein
said k is 2,
said wavelength converter means is an optical material crystal having a second-order non-linear effect, and
a wavelength band of said fundamental light is 1.3 $\mu$m.

7. A light source for outputting a light for wavelength division multiplexing transmission wherein a plurality of lights varied in wavelength are multiplexed, said light source comprising:

a plurality of emitters operable to emit a plurality of fundamental-wave lights controlled to be k times longer in wavelength than lights to be multiplexed and to have a wavelength interval between each adjacent fundamental-wave light, wherein k is greater than 1;

a wavelength converter operable to receive the fundamental-wave lights and output lights including lights of one-kth a wavelength of each of the fundamental-wave lights; and a multiplexer operable to multiplex the lights outputted from said wavelength converter.

8. The light source for wavelength multiplexing according to claim 7, further comprising a transmission medium capable of transmitting a light from said multiplexer.

9. The light source for wavelength multiplexing according to claim 8, wherein
k is 2,
said wavelength converter is an optical material crystal having a second-order non-linear optical effect,
a wavelength band of the fundamental-wave light is 1.3 $\mu$m, and
said transmission medium is a polymethyl methacrylate plastic optical fiber.

10. A light source for outputting a light for wavelength division multiplexing transmission wherein a plurality of lights varied in wavelength are multiplexed, said light source comprising:

a plurality of emitters operable to emit a plurality of fundamental-wave lights controlled to be k times longer in wavelength than lights to be multiplexed and to have a wavelength interval between each adjacent fundamental-wave light, wherein k is greater than 1; and a wavelength converter operable to receive the fundamental-wave lights and output lights including lights of one-kth a wavelength of each of the fundamental-wave lights;

wherein
the lights outputted from the wavelength converter further include fundamental-wave lights, and
a wavelength band of each of the fundamental-wave lights is eliminated through a loss at transmission.

11. A light source for outputting a light for wavelength division multiplexing transmission wherein a plurality of lights varied in wavelength are multiplexed, said light source comprising:

a plurality of emitters operable to emit a plurality of fundamental-wave lights controlled to be k times longer in wavelength than lights to be multiplexed and to have a wavelength interval between each adjacent fundamental-wave light, wherein k is greater than 1; and a wavelength converter operable to receive the fundamental-wave lights and output lights including lights of one-kth a wavelength of each of the fundamental-wave lights;

wherein
k is 2,
said wavelength converter is an optical material crystal having a second-order non-linear optical effect,
the lights outputted from the wavelength converter further include fundamental-wave lights, and
a wavelength band of each of the fundamental-wave lights is eliminated through a loss at transmission.

12. A light source for outputting a light for wavelength division multiplexing transmission wherein a plurality of lights varied in wavelength are multiplexed, said light source comprising:

a plurality of emitters operable to emit a plurality of fundamental-wave lights controlled to be k times longer in wavelength than lights to be multiplexed and to have a wavelength interval between each adjacent fundamental-wave light, wherein k is greater than 1; and a wavelength converter operable to receive the fundamental-wave lights and output lights including lights of one-kth a wavelength of each of the fundamental-wave lights a transmission medium positioned to directly receive the lights outputted from said wavelength converter and capable of transmitting the lights;

wherein
said transmission medium is a polymethyl methacrylate plastic optical fiber,
k is 2,
said wavelength converter is an optical material crystal having a second-order non-linear optical effect, and
a wavelength band of the fundamental-wave light is 1.3 $\mu$m.

* * * * *